US012627045B2

(12) United States Patent
Da Silveira et al.

(10) Patent No.: US 12,627,045 B2
(45) Date of Patent: May 12, 2026

(54) ADVANCED ANTENNA SYSTEM (AAS) SUBARRAY SPLITTER WITH ADVANCED UPPER SIDELOBE SUPPRESSION (AUSS)

(71) Applicant: Telefonaktiebolaget LM Ericsson (publ), Stockholm (SE)

(72) Inventors: Martin Da Silveira, Ottawa (CA); Neil Mcgowan, Stittsville (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 652 days.

(21) Appl. No.: 17/918,635

(22) PCT Filed: Apr. 15, 2020

(86) PCT No.: PCT/IB2020/053574
§ 371 (c)(1),
(2) Date: Oct. 13, 2022

(87) PCT Pub. No.: WO2021/209791
PCT Pub. Date: Oct. 21, 2021

(65) Prior Publication Data
US 2023/0146081 A1 May 11, 2023

(51) Int. Cl.
*H01Q 3/00* (2006.01)
*H01Q 3/28* (2006.01)
(Continued)

(52) U.S. Cl.
CPC ................. *H01Q 3/36* (2013.01); *H01Q 3/28* (2013.01); *H01Q 21/22* (2013.01); *H01Q 3/26* (2013.01); *H01Q 21/0006* (2013.01)

(58) Field of Classification Search
CPC .. H01Q 3/36; H01Q 3/26; H01Q 3/28; H01Q 21/0006; H01Q 21/22
(Continued)

(56) References Cited

U.S. PATENT DOCUMENTS 4,642,645 A * 2/1987 Haupt .................. H01Q 3/2694 342/371
9,252,485 B2 * 2/2016 Haskell ................ H01Q 3/2694
(Continued)

FOREIGN PATENT DOCUMENTS

CN 104718661 A * 6/2015 ............... H01Q 3/36
CN 111095003 A * 5/2020 ........... G01R 29/105
(Continued)

OTHER PUBLICATIONS

International Search Report and Written Opinion dated Jan. 11, 2021 issued in PCT Application No. PCT/IB2020/053574, consisting of 13 pages.
(Continued)

*Primary Examiner* — Chuong P Nguyen
(74) *Attorney, Agent, or Firm* — Weisberg I.P. Law, P.A.

(57) ABSTRACT

Methods and apparatuses are provided for advanced antenna system subarray splitter having advanced upper sidelobe suppression. An antenna system includes a plurality of antenna subarrays. Each of the plurality of antenna subarrays having a subarray input; and at least one subarray splitter in communication with the subarray input. Each of the at least one subarray splitter splits a subarray into a plurality of branches, at least one of the branches including a phase taper function and an amplitude taper function. For each of the plurality of antenna subarrays, the phase taper function and the amplitude taper function includes a plurality of fixed phase values and a plurality of fixed amplitude values, respectively, that are configured to not exceed a predetermined sidelobe suppression target for a plurality of electrical tilt angles across a predetermined angular range for the antenna subarray of the plurality of antenna subarrays.

26 Claims, 9 Drawing Sheets

(51) Int. Cl.
*H01Q 3/36* (2006.01)
*H01Q 21/22* (2006.01)
*H01Q 3/26* (2006.01)
*H01Q 21/00* (2006.01)

(58) Field of Classification Search
USPC .......................................................... 342/372
See application file for complete search history.

(56) References Cited

U.S. PATENT DOCUMENTS

| | | | | |
|---|---|---|---|---|
| 10,686,251 | B2 * | 6/2020 | Shapoury | H01Q 3/36 |
| 10,714,836 | B1 * | 7/2020 | Karabacak | H04B 7/0868 |
| 11,228,119 | B2 * | 1/2022 | Schwartz | H01Q 21/22 |
| 11,245,442 | B1 * | 2/2022 | Foo | H01Q 21/28 |
| 11,967,766 | B2 * | 4/2024 | Salman | H01Q 3/2635 |
| 2016/0352010 | A1 * | 12/2016 | Haskell | H01Q 3/30 |

FOREIGN PATENT DOCUMENTS

| | | | | | |
|---|---|---|---|---|---|
| CN | 111095003 | B | * | 10/2021 | G01R 29/105 |
| EP | 0917240 | A1 | * | 5/1999 | H01Q 3/2605 |
| EP | 2 434 577 | A1 | | 3/2012 | |
| EP | 3285422 | A1 | * | 2/2018 | H04B 7/0691 |
| JP | H02 174302 | A | | 7/1990 | |
| JP | 0917240 | A1 | * | 5/1999 | H01Q 3/2605 |
| JP | 2005 252396 | A | | 9/2005 | |
| WO | WO-2007010164 | A2 | * | 1/2007 | H01Q 3/30 |
| WO | WO-2015167607 | A1 | * | 11/2015 | H01Q 1/22 |

OTHER PUBLICATIONS

European Communication Pursuant to Article 94(3) EPC dated Mar. 13, 2025 issued in corresponding European Application No. 20 721 758.9, consisting of 13 pages.

* cited by examiner

ADVANCED ANTENNA SYSTEM (AAS) SUBARRAY SPLITTER WITH ADVANCED UPPER SIDELOBE SUPPRESSION (AUSS)

CROSS-REFERENCE TO RELATED APPLICATIONS

This application is a Submission Under 35 U.S.C. § 371 for U.S. National Stage Patent Application of International Application Number: PCT/IB2020/053574, filed Apr. 15, 2020 entitled "ADVANCED ANTENNA SYSTEM (AAS) SUBARRAY SPLITTER WITH ADVANCED UPPER SIDELOBE SUPPRESSION (AUSS)," the entirety of which is incorporated herein by reference.

TECHNICAL FIELD

The present disclosure relates wireless communications and, in particular, to an advanced antenna system (AAS) subarray splitter with advanced upper sidelobe suppression (AUSS).

BACKGROUND

Wireless networks may use advanced antenna systems to support an increasing demand for wireless communications. These advanced antenna systems may be configured to operate over a wide range of frequencies and/or angles. In addition, these antennas may be designed to reduce unwanted signals such as the sidelobes, which may represent energy waste and/or cause interference to other equipment. Arrangements to further improve the performance and efficiency of such antenna systems are still being considered.

SUMMARY

Some embodiments of the present disclosure advantageously provide methods, apparatuses and systems related to advanced antenna system (AAS) subarray splitter with advanced upper sidelobe suppression (AUSS).

According to one aspect of the present disclosure, an antenna system is provided. The antenna system includes a plurality of antenna subarrays. Each of the plurality of antenna subarrays has a subarray input; and at least one subarray splitter in communication with the subarray input. Each of the at least one subarray splitter splitting the antenna subarray into a plurality of branches. At least one of the branches includes a phase taper function and an amplitude taper function. For each of the plurality of antenna subarrays, the phase taper function and the amplitude taper function including a plurality of fixed phase values and a plurality of fixed amplitude values, respectively, that are configured to not exceed a predetermined sidelobe suppression target for a plurality of electrical tilt angles across a predetermined angular range for the antenna subarray of the plurality of antenna subarrays.

In some embodiments, the phase taper function comprises a phase progression and a phase taper. In some embodiments, each fixed phase value of the plurality of fixed phase values corresponds to a single frequency, and each fixed amplitude value of the plurality of fixed amplitude values corresponds to a single frequency.

In some embodiments of this aspect, the antenna system further includes, for each of the plurality of antenna subarrays, a plurality of antenna elements, a first antenna element of the plurality of antenna elements being separated from a second antenna element of the plurality of antenna elements by a first distance, d, wherein the phase taper function is based in part on the first distance, d. In some embodiments, the antenna system further includes, for at least one of the plurality of antenna subarrays, a third antenna element of the plurality of antenna elements, the third antenna element being separated from the second antenna element by a second distance, the second distance being different from the first distance, d.

In some embodiments of this aspect, the predetermined sidelobe suppression target is a maximum sidelobe level threshold in a sidelobe suppression angular region. In some embodiments of this aspect, the sidelobe suppression angular region is at least one of: according to a specification requirement; and 20 degrees above a peak.

In some embodiments of this aspect, the predetermined angular range is between 2 degrees and 12 degrees relative to a horizon. In some embodiments of this aspect, the plurality of fixed phase values and the plurality of fixed amplitude values are configured to not exceed the predetermined sidelobe suppression target for the plurality of electrical tilt angles and further for a plurality of frequencies.

In some embodiments of this aspect, the plurality of fixed phase values and the plurality of fixed amplitude values are configured to not exceed the predetermined sidelobe suppression target for the plurality of electrical tilt angles and further for a set of phase and amplitude excitation values corresponding to at least one input signal into the subarray input, the at least one input signal corresponding to at least one cellular signal and the set of phase and amplitude excitation values being for electrically titling a beam of the antenna system in a vertical direction.

In some embodiments of this aspect, each of the plurality of electrical tilt angles are different from one another and the configuration of the plurality of fixed phase values and the plurality of fixed amplitude values is to not exceed the predetermined sidelobe suppression target for each of the plurality of different, electrical tilt angles across the predetermined angular range. In some embodiments of this aspect, the configuration is according to an algorithm to minimize a cost function. In some embodiments of this aspect, the cost function is based at least in part on at least one of: a maximum power of at least one sidelobe in a sidelobe suppression angular region for each of the plurality of electrical tilt angles; a power at a beam peak direction at each of the plurality of electrical tilt angles; a target power of a beam peak at each of the plurality of electrical tilt angles; a target sidelobe power at each of the plurality of electrical tilt angles; and at least one weighting factor associated with a specification requirement for at least one of the plurality of electrical tilt angles.

In some embodiments of this aspect, the at least one subarray splitter includes one subarray splitter in communication with the corresponding subarray input. In some embodiments of this aspect, the at least one subarray splitter includes a multi-way splitter in communication with the corresponding subarray input, the multi-way splitter splitting the antenna subarray into at least two antenna subarrays; at least one phase shifter at an output of the multi-way splitter and between the multi-way splitter and at least one antenna subarray of the at least two antenna subarrays; and for each of the at least two antenna subarrays, a second subarray splitter splitting the respective antenna subarray into the plurality of branches.

According to another embodiment of the present disclosure, a method implemented in an antenna system is provided. The method includes electrically tilting a beam in a vertical direction using a plurality of antenna subarrays.

Each of the plurality of antenna subarrays having a subarray input; and at least one subarray splitter in communication with the subarray input. Each of the at least one subarray splitter splitting the antenna subarray into a plurality of branches. At least one of the branches including a phase taper function and an amplitude taper function. For each of the plurality of antenna subarrays, the phase taper function and the amplitude taper function including a plurality of fixed phase values and a plurality of fixed amplitude values, respectively, that are configured to not exceed a predetermined sidelobe suppression target for a plurality of electrical tilt angles across a predetermined angular range for the antenna subarray of the plurality of antenna subarrays.

In some embodiments, the phase taper function comprises a phase progression and a phase taper. In some embodiments, each fixed phase value of the plurality of fixed phase values corresponds to a single frequency, and each fixed amplitude value of the plurality of fixed amplitude values corresponds to a single frequency.

In some embodiments of this aspect, each of the plurality of antenna subarrays includes a plurality of antenna elements, a first antenna element of the plurality of antenna elements being separated from a second antenna element of the plurality of antenna elements by a first distance, d, wherein the phase taper function is based in part on the first distance, d. In some embodiments, the antenna system further includes, for at least one of the plurality of antenna subarrays, a third antenna element of the plurality of antenna elements, the third antenna element being separated from the second antenna element by a second distance, the second distance being different from the first distance, d.

In some embodiments of this aspect, the predetermined sidelobe suppression target is a maximum sidelobe level threshold in a sidelobe suppression angular region. In some embodiments of this aspect, the sidelobe suppression angular region is at least one of: according to a specification requirement; and 20 degrees above a peak. In some embodiments of this aspect, the predetermined angular range is between 2 degrees and 12 degrees relative to a horizon.

In some embodiments of this aspect, the plurality of fixed phase values and the plurality of fixed amplitude values are configured to not exceed the predetermined sidelobe suppression target for the plurality of electrical tilt angles and further for a plurality of frequencies. In some embodiments of this aspect, the plurality of fixed phase values and the plurality of fixed amplitude values are configured to not exceed the predetermined sidelobe suppression target for the plurality of electrical tilt angles and further for a set of phase and amplitude excitation values corresponding to at least one input signal into the subarray input, the at least one input signal corresponding to at least one cellular signal and the set of phase and amplitude excitation values being for electrically titling the beam of the antenna system in the vertical direction.

In some embodiments of this aspect, each of the plurality of electrical tilt angles are different from one another and the configuration of the plurality of fixed phase values and the plurality of fixed amplitude values is to not exceed the predetermined sidelobe suppression target for each of the plurality of different, electrical tilt angles across the predetermined angular range. In some embodiments of this aspect, the configuration is according to an algorithm to minimize a cost function. In some embodiments of this aspect, the cost function is based at least in part on at least one of: a maximum power of at least one sidelobe in a sidelobe suppression angular region for each of the plurality of electrical tilt angles; a power at a beam peak direction at each of the plurality of electrical tilt angles; a target power of a beam peak at each of the plurality of electrical tilt angles; a target sidelobe power at each of the plurality of electrical tilt angles; and at least one weighting factor associated with a specification requirement for at least one of the plurality of electrical tilt angles.

In some embodiments of this aspect, the at least one subarray splitter includes one subarray splitter in communication with the corresponding subarray input. In some embodiments of this aspect, the at least one subarray splitter includes a multi-way splitter in communication with the corresponding subarray input, the multi-way splitter splitting the antenna subarray into at least two antenna subarrays; at least one phase shifter at an output of the multi-way splitter and between the multi-way splitter and at least one antenna subarray of the at least two antenna subarrays; and for each of the at least two antenna subarrays, a second subarray splitter splitting the respective antenna subarray into the plurality of branches.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
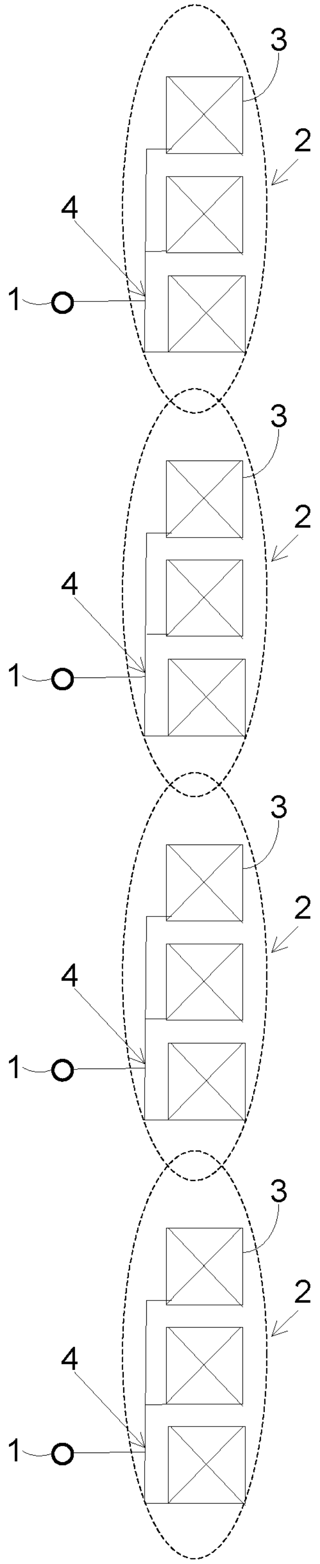
FIG. 1 is a schematic diagram illustrating one column of an example multi-column antenna array.

Referring now to the drawing figures in which like reference designators refer to like elements, some embodiments of the present disclosure consider one column of a multi-column AAS antenna array with dual polarized elements per column as shown in FIG. 1, as an example. In the example of FIG. 1, there are four subarray inputs, 1 for four input signals, $S_1(t)$, $S_2(t)$, $S_3(t)$ and $S_4(t)$, where the relative phase and amplitude between the input signals can be adjusted in the digital or baseband domain. Each subarray input 1 may be connected to an antenna subarray 2, such as a three antenna element 3 subarray as shown in FIG. 1, through a splitter 4, such as the three-way splitter shown in FIG. 1.

In typical designs, the subarray splitters have a uniform amplitude taper and linear phase progression. The vertical beam (i.e., beam tilted in a vertical direction) can be tilted by adjusting the relative phase between the digital signals. The upper sidelobe level above the horizon is considered interference to other cells and should typically be below 15 decibels (dB) relative to the peak gain for a vertical angular range of 20 degrees (typical) above the peak direction. A nominal phase progression resulting in an electrical tilt (hereafter referred to as tilt) of 7 degrees is typically built into the splitters. Unfortunately, when tilting (usually referred to as remote electrical tilt) the beam e.g., between 2 and 12 degrees, the built-in nominal phase progression may result in an increase of the upper sidelobe level above a specification requirement. In order to reduce the upper sidelobe level, amplitude taper is typically applied to the digital signals. However, applying amplitude taper to the digital signals to reduce the upper sidelobe level may result in a significant reduction of the effective isotropic radiated power (EIRP), which is undesirable.

In some cases, amplitude taper can be applied to the subarray inputs which may also result in a significant reduction of antenna efficiency and EIRP.

Some embodiments of the present disclosure provide for an advanced upper sidelobe suppression (AUSS), which may include one or more of the following:

1. The upper sidelobe level may be improved (e.g., further suppressed), as compared to existing upper sidelobe levels by modifying the subarray phases delivered by the subarray splitters to excite the individual elements depending on e.g., a vertical location of the subarray (e.g., relative to a vertical location of the other subarrays in the antenna system and/or an antenna column).
2. The phases delivered by the subarray splitter may be jointly optimized with the digital excitation phases to achieve the desired upper sidelobe performance at several tilt angles simultaneously.
3. This may result in static splitter designs which are used together with a few excitation sets which can be linearly tilted to cover the full range of tilt angles and frequencies that are expected to be used by the system.
4. The excitations may be digitally controlled with a transceiver for each subarray. It may also be possible to use some embodiments of the antenna system along with a combination of analog phase shifters together with digitally controlled transceivers or with all analog phase shifters.

In traditional antennas, remote electrical tilt (RET) was achieved with phase shifters. In AAS antennas, RET can be achieved with a combination of digital and analog phase shifters. For example, the antenna in FIG. 1 does not have a phase shifter but, by adjusting the input signals, remote electrical tilt can also be achieved. Some embodiments of the present disclosure may provide techniques related to RET and/or electrical tilt. For the sake of brevity, the shortened term "tilt" may be used in this disclosure.

Some embodiments of the present disclosure may provide one or more of the following advantages:

1. Significant improvement in the upper sidelobe level over a predetermined (e.g., required) tilt/angular range.
2. No taper loss (or at least reduced taper loss as compared to existing arrangements) in the antenna.
3. No loss in EIRP due to taper loss, as compared to existing arrangements, as there is no amplitude taper applied at the subarray inputs. Stated another way, in some embodiments, amplitude taper may be applied at the splitter which does not reduce EIRP as a result of taper loss, as with some existing arrangements e.g., in which amplitude taper is applied at the subarray inputs.

Before describing in detail exemplary embodiments, it is noted that the embodiments reside primarily in combinations of apparatus components and processing steps related to advanced antenna system (AAS) subarray splitter with advanced upper sidelobe suppression (AUSS). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The antenna system discussed herein may be any antenna system, such as, for example, an antenna system in a network node comprised in a radio network which may further be comprised in and/or connected to any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU), Remote Radio Head (RRH), baseband unit (BBU), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a user equipment (UE) or a radio network node.

Note that although terminology from one particular wireless system, such as, for example, Third Generation Partnership Project (3GPP) Long Term Evolution (LTE) and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide arrangements related to advanced antenna system (AAS) subarray splitter with advanced upper sidelobe suppression (AUSS).

First Embodiment Antenna Array

Figure 2:
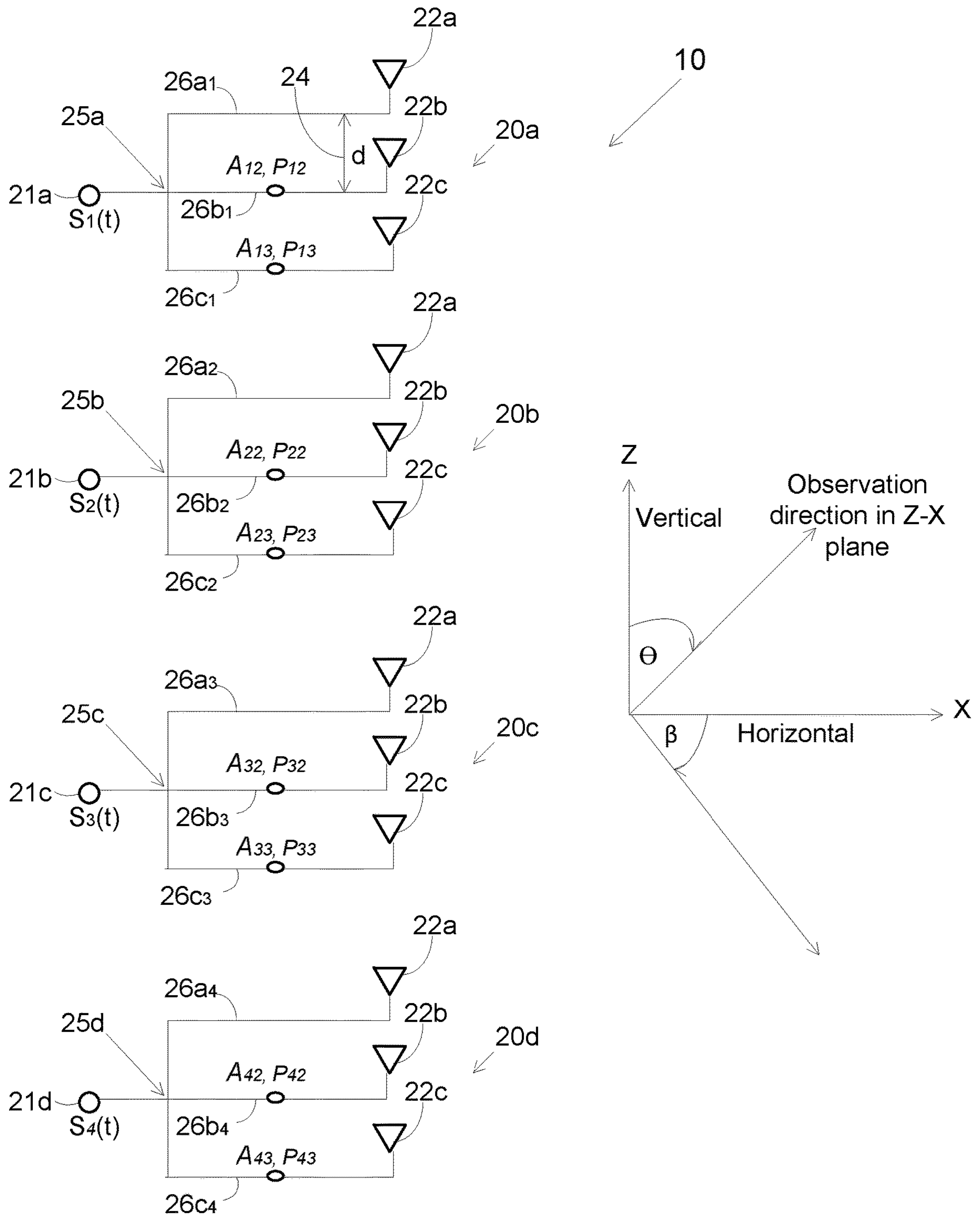
FIG. 2 is a schematic diagram illustrating an antenna array configuration according to one embodiment of the present disclosure.

FIG. 2 illustrates an antenna system 10 having an array configuration according to one embodiment of the present disclosure. The antenna system 10 shown includes at least one column of antenna subarrays 20 (antenna subarray 20*a*, antenna subarray 20*b*, antenna subarray 20*c* and antenna subarray 20*d*, are collectively referred to as antenna subarrays 20) and one polarization of the antenna array shown in FIG. 2. The column of the antenna subarrays 20 includes N=4 antenna subarrays, each having a subarray input 21 (subarray input 21*a*, subarray input 21*b*, subarray input 21*c* and subarray input 21*d*, collectively subarray input 21) for an input signal $s_i(t)$ and where i=1, 2, . . . , N is the subarray index and t is the time sample. There are K=3 antenna elements 22 (antenna element 22*a*, antenna element 22*b* and antenna element 22*c*, collectively antenna elements 22) per antenna subarray 20. In addition, the spacing or distance 24 between antenna elements 22 is denoted as d. For each subarray input 21 signal, a subarray splitter 25 (such as splitter 25*a*, splitter 25*b*, splitter 25*c* and splitter 25*d*, collectively splitters 25) splits the corresponding antenna subarray 20 into a plurality of branches 26 (branch 26*a*, branch 26*b* and branch 26*c*, collectively branches 26). The amplitude and phase excitations of the branches 26 of each antenna subarray 20 relative to the first branch 26*a* is denoted in FIG. 2 as $A_{ik}$ and $P_{ik}$, respectively, where k=1, 2, . . . , K is the branch index. The antenna boresight of the antenna system 10 is in the X-direction and the column of antenna subarrays 20 is orientated in the Z-direction, as indicated in FIG. 2.

The radiated signal power in the desired far-field polarization in the vertical or elevation plane (Z-X plane of the antenna array) of each antenna subarray 20 in direction θ may be given by, for example:

$$g_i(t,\theta) = \left| s_i(t) \sum_{k=1}^{K} f_i(\theta) A_{ik} e^{-j\left(P_{ik} + \left(\frac{2\pi}{\lambda}\right) d\cos(\theta)\right)} / r^2 \right|^2, \tag{1}$$

where $f_i(\theta)$ is the antenna element pattern. The distance factor $1/r^2$ may not affect the concept and will be omitted for simplicity. The total radiated signal power of all the antenna subarrays 20 in the direction θ may be given by, for example:

$$H(t,\theta) = \sum_{i=1}^{N} g_i(t,\theta) = \sum_{i=1}^{N} \left| s_i(t) \sum_{k=1}^{K} f_i(\theta) A_{ik} e^{-j\left(P_{ik} + \left(\frac{2\pi}{\lambda}\right) d\cos(\theta)\right)} / r^2 \right|^2. \tag{2}$$

Antenna systems 10 for cellular communications, for example, are typically electrically down-tilted below the horizon (X-axis) to some nominal value $\beta=\beta_{nom}$ (with $\beta=\theta-90°$) by implementing a fixed phase progression in the subarray splitter 25 phases $P_{ik}$ as well as applying a digital phase progression in the input signals $s_i(t)$. The required phase progression in the antenna subarrays 20 may be given by, for example:

$$P_{ik} = e^{j(k-1)\left(\frac{2\pi}{\lambda}\right) d\sin(\beta_{nom})}. \tag{3}$$

The input signals may include the regular cellular signals, $s_{ic}(t)$, as well as the amplitude and phase excitation values required for shaping and tilting a beam in a vertical direction, as follows, for example:

$$s_i(t) = s_{ic}(t) A_{si}(t) e^{jP_{si}(t)}. \tag{4}$$

The cellular part of the signal may not affect the concept and will be omitted for simplicity. The amplitude $A_{si}(t)$ and phase $P_{si}(t)$ only changes when the antenna system 10 is re-configured or when the tilt changes. The time aspect of these amplitude and phase values may not affect the concept and will be omitted for simplicity.

The required linear phase progression between the digital input signals $s_i$ for tilting or steering the array peak to an angle $\beta=\beta_{tilt}$ may be given by, for example:

$$P_{si} = e^{j(i-1)\left(\frac{2\pi}{\lambda}\right) Kd\sin(\beta_{tilt})}. \tag{5}$$

Figure 3:
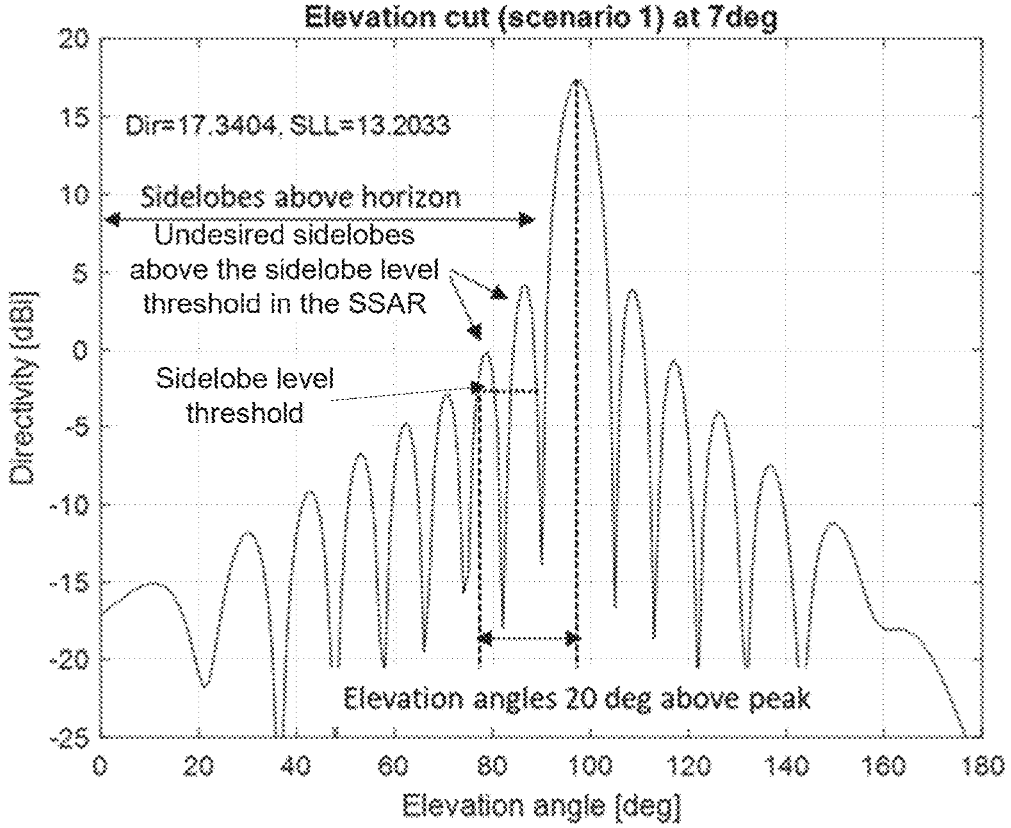
FIG. 3 illustrates an example radiation pattern with a 7 degree nominal electrical tilt (peak at 97 degrees) and uniform amplitude weighting (scenario 1)

An example of the radiation pattern for a nominal tilt of β=7° and antenna elements spacing/distance 24 d=97 mm (millimeters) is shown in FIG. 3. In this case, there is a uniform amplitude taper $A_{ik}=1$ and ($A_{si}=1$) with only a linear phase progression at the four inputs to achieve the nominal tilt. The angular region where the sidelobes cause interference to neighboring cells and are therefore undesirable and should be suppressed will be termed herein as the Sidelobe Suppression Angular Region (SSAR) and is from the peak direction ($\theta=\theta_{peak}$) to δ degrees above the peak, i.e. SSAR is the angles $\theta=\{\theta_{peak}-\delta, \ldots, \theta_{peak}\}$ A value of δ=20° above the peak is a typical value used in antenna specifications. The maximum sidelobe level for a good antenna design in the SSAR may be 13.2 dB (this can be worse if there are phase and amplitude errors in the antenna design). Note that angles above the peak refer to θ angles that are smaller than the angle where the peak is located.

Figure 4:
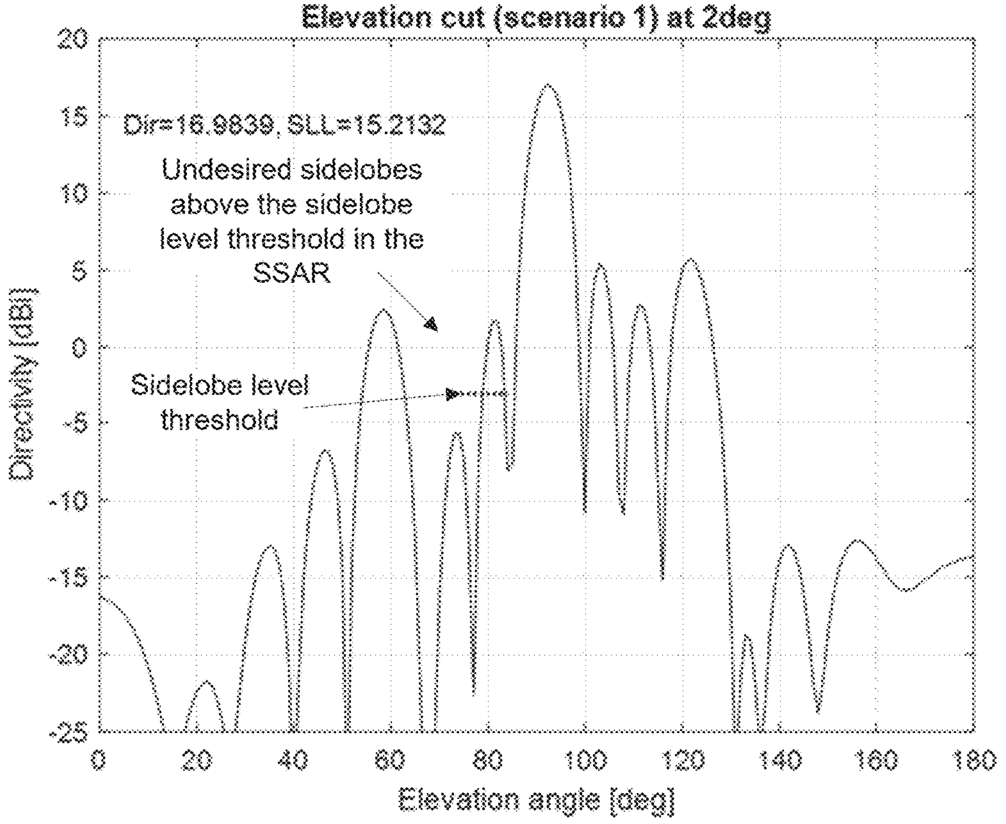
FIG. 4 illustrates an example beam tilted down 2 degrees (peak at 92 degrees) with uniform amplitude weighting (scenario 1)
Figure 5:
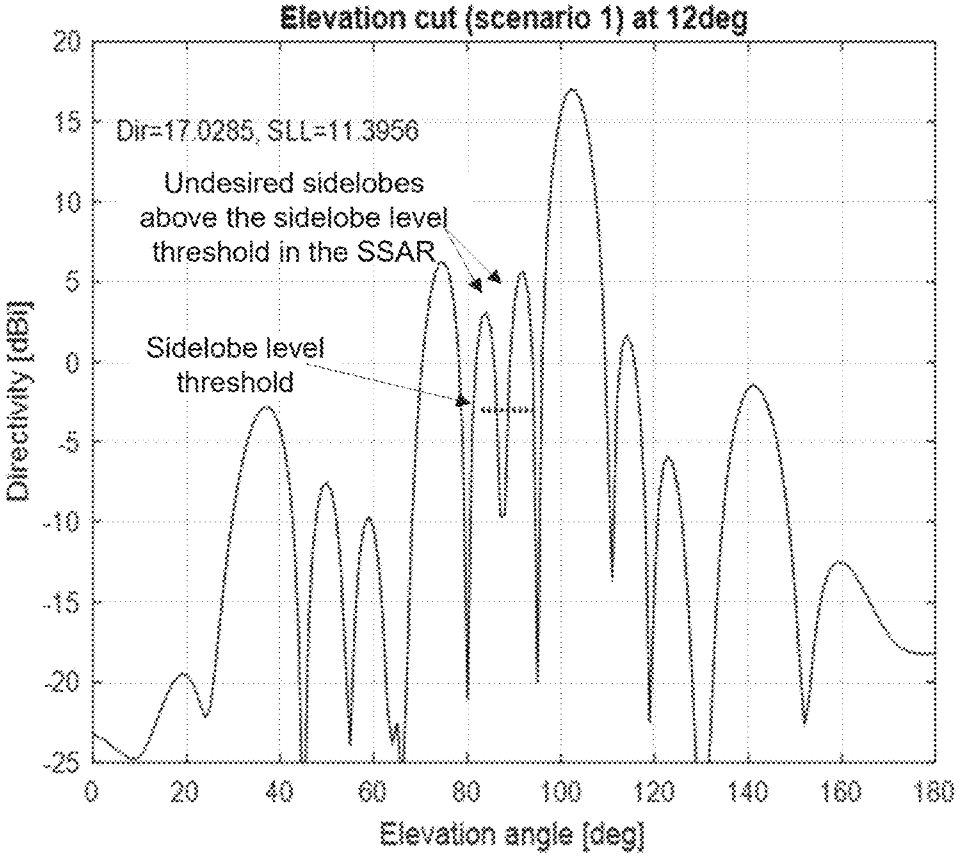
FIG. 5 illustrates an example beam tilted to 12 degrees (peak at 102 degrees) with uniform amplitude weighting (scenario 1)

By applying a different phase progression between the input signals, $s_i$, the pattern peak can be steered or tilted to other angles as shown in FIG. 4, for example, for a 2 degree tilt and FIG. 5 for 12 degree tilt. It can be seen from FIGS. 4 and 5 that the sidelobe level in the SSAR is 15.2 dB and 11.4 dB for the 2 degree and 12 degree tilt values, respectively. As can be seen in FIGS. 3-5, the undesired sidelobe levels are present above the sidelobe level threshold in the SSAR on the graphs.

In the case where amplitude taper ($A_{si}$) is used for the input signals, the sidelobes in the SSAR can be reduced; however, this may result in a reduction in the efficiency of the antenna array.

In some embodiments, using the AUSS arrangements discussed herein, the amplitude and phases delivered by the subarray splitter 25 to the antenna elements 22 may be configured and/or jointly optimized with the digital excitation phases to achieve a desired sidelobe performance in the SSAR at several tilt angles (e.g., a predetermined angular range), simultaneously.

This may result in static/fixed splitter designs which are configured to be used together with a few (e.g., predetermined) excitation sets and which can be linearly tilted to cover the full range of tilt angles and frequencies that the system 10 may be configured for.

One example of a detailed configuration/optimization procedure for the AUSS arrangements discussed herein will be described as follows.

Example Configuration/Optimization Procedure for AUSS

From equation (2) above for example, a maximum power of the sidelobes in the SSAR may be determined for each tilt angle $\beta_{tilt}(q)$, with q={1, 2, . . . , Q} (e.g., of a predetermined angular range) to give $U_s(q)=\max(H(\{\theta_{peak}-\delta, \ldots, \theta_{peak}\}, \beta_{tilt}(q))$. The power at the peak for tilt angle $\beta_{tilt}(q)$ from equation (2) is $U_p(q)=H(\theta_{peak}, \beta_{tilt}(q))$. Q is the total number of tilt values.

The total optimization cost function, $U_{opt}$ may then be given by, for example:

$$U_{opt} = \sum_{q=1}^{Q} \left(\alpha_p(q)|U_{pd}(q) - U_p(q)|^2 + \alpha_s(q)|U_{sd}(q) - U_s(q)|^2\right). \quad (6)$$

$U_{pd}(q)$ is the target power of the peak at tilt angle $\beta_{tilt}(q)$. $U_{sd}(q)$ is the target sidelobe power at tilt angle $\beta_{tilt}(q)$. The parameters $\alpha_p$ and $\alpha_p$ are weighting factors to allow emphasis of some requirements relative to others at different tilt angles. Each of these parameters may be set to zero if the requirement is met.

Using an optimization function, such as the Generalized Reduced Gradient (GRG) algorithm or another known optimization function, the values (e.g., fixed values) for the amplitudes $A_{ik}$ and phases $P_{ik}$ of each splitter 25 and/or the phases of the input signals $P_{si}$ may be selected and/or determined in order to minimize the cost function $U_{opt}$.

The following results, shown in the simulation graphs depicted in FIGS. 6-11, can be achieved using AUSS to optimize/configure the parameters (e.g., phase taper function and amplitude taper function of the branches 26 of the antenna subarray 20, fixed amplitude and phase values for each splitter 25, etc.) of an example antenna array, such as the antenna system 10 in FIG. 2 having four antenna subarrays 20 and element spacing/distance 24 of 97 mm for a sidelobe suppression target of 20 dB (10 $\log_{10}(U_{sd})$). The excitation values calculated for the example antenna system 10 using the optimization procedure and one or more of the formulas above were imported into a high-frequency structure simulator (HFSS) to simulate the far field pattern, shown in the graphs depicted in FIGS. 6-11. This HFSS simulation may include the effect of mutual coupling.

Figure 6:
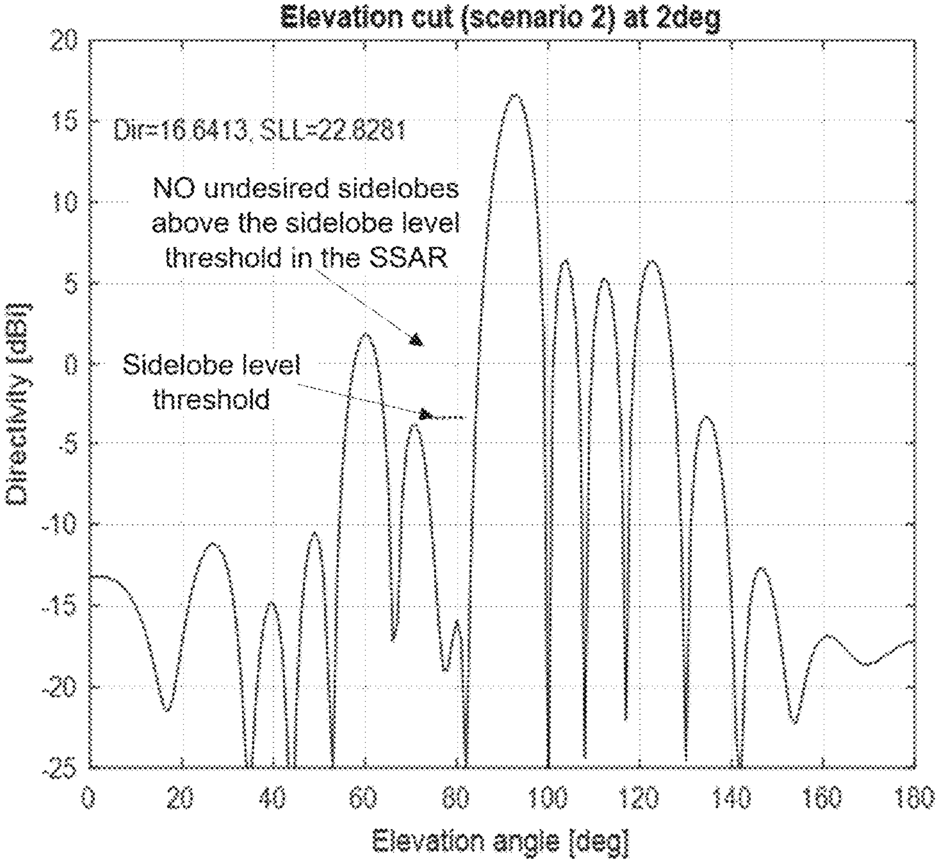
FIG. 6 illustrates an example beam tilted down 2 degrees (peak at 92 degrees) with optimized amplitude and phase taper (scenario 2)

FIG. 6 is a graph that illustrates an example of a beam tilted down 2 degrees (peak at 92 degrees) with optimized amplitude and phase taper (scenario 2).

Figure 7:
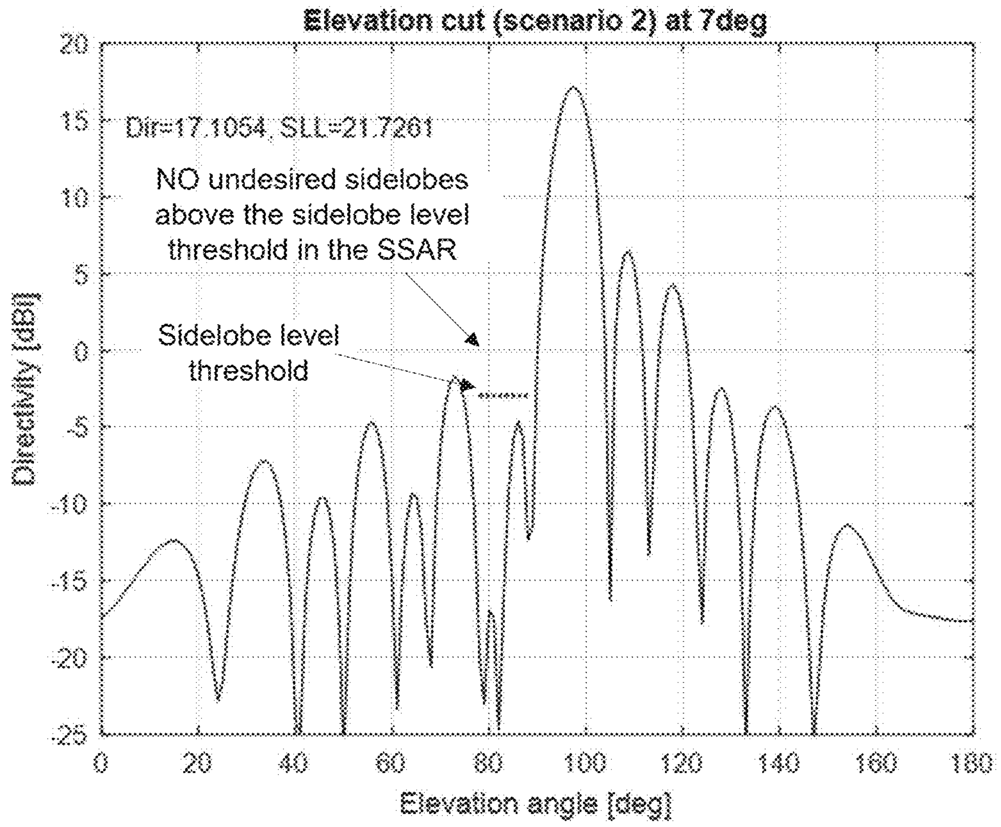
FIG. 7 illustrates an example beam tilted down 7 degrees (peak at 97 degrees) with optimized amplitude and phase taper (scenario 2)

FIG. 7 is a graph that illustrates an example of a beam tilted down 7 degrees (peak at 97 degrees) with optimized amplitude and phase taper (scenario 2).

Figure 8:
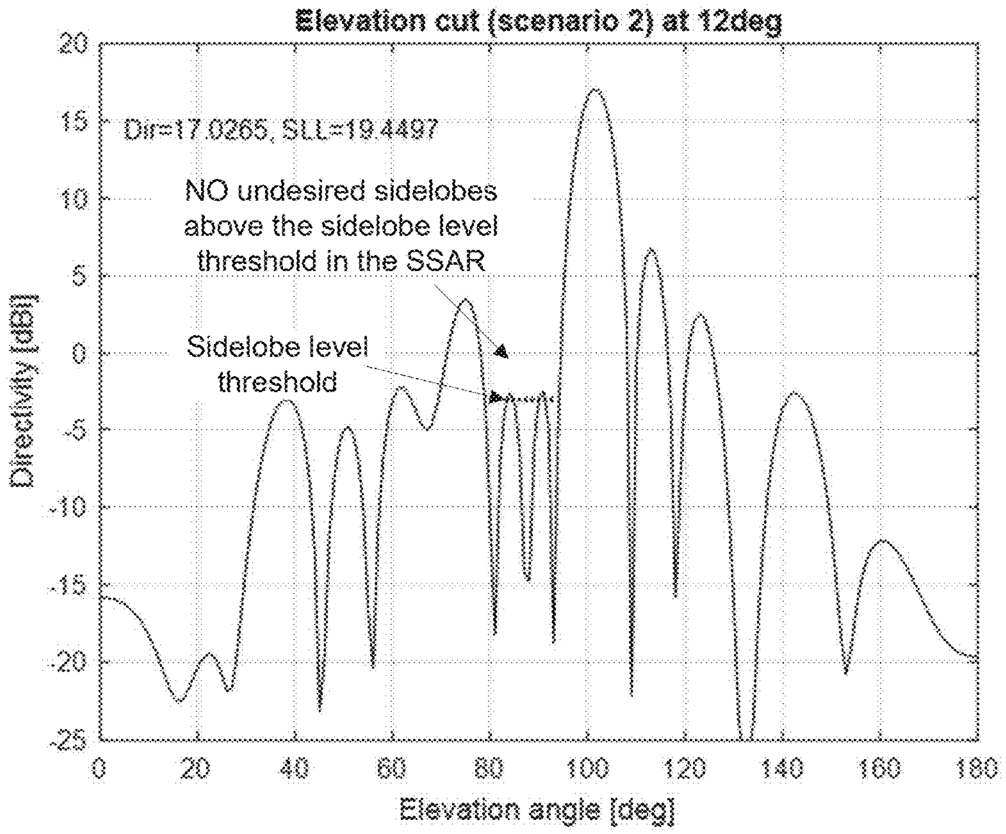
FIG. 8 illustrates an example beam tilted down 12 degrees (peak at 102 degrees) with optimized amplitude and phase taper (scenario 2)

FIG. 8 is a graph that illustrates an example of a beam tilted down 12 degrees (peak at 102 degrees) with optimized amplitude and phase taper (scenario 2).

Figure 9:
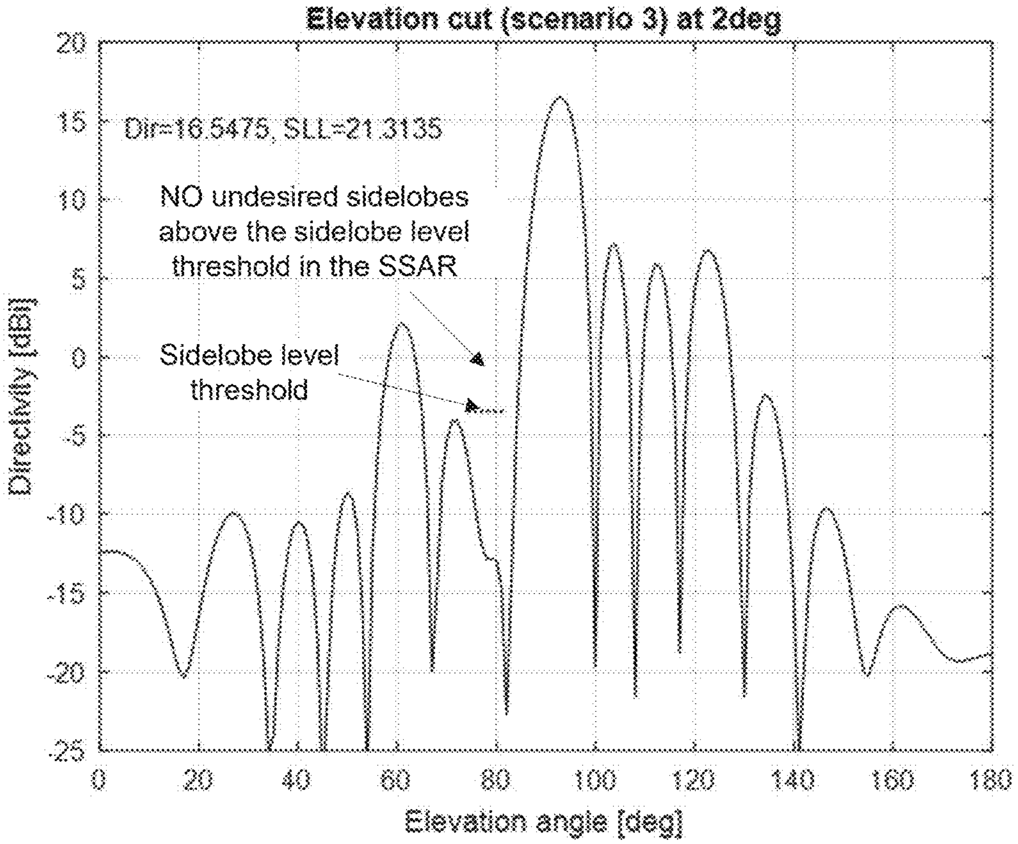
FIG. 9 illustrates an example beam tilted down 2 degrees (peak at 92 degrees) with optimized phase only taper (scenario 3)

FIG. 9 is a graph that illustrates an example of a beam tilted down 2 degrees (peak at 92 degrees) with optimized phase only taper (scenario 3).

Figure 10:
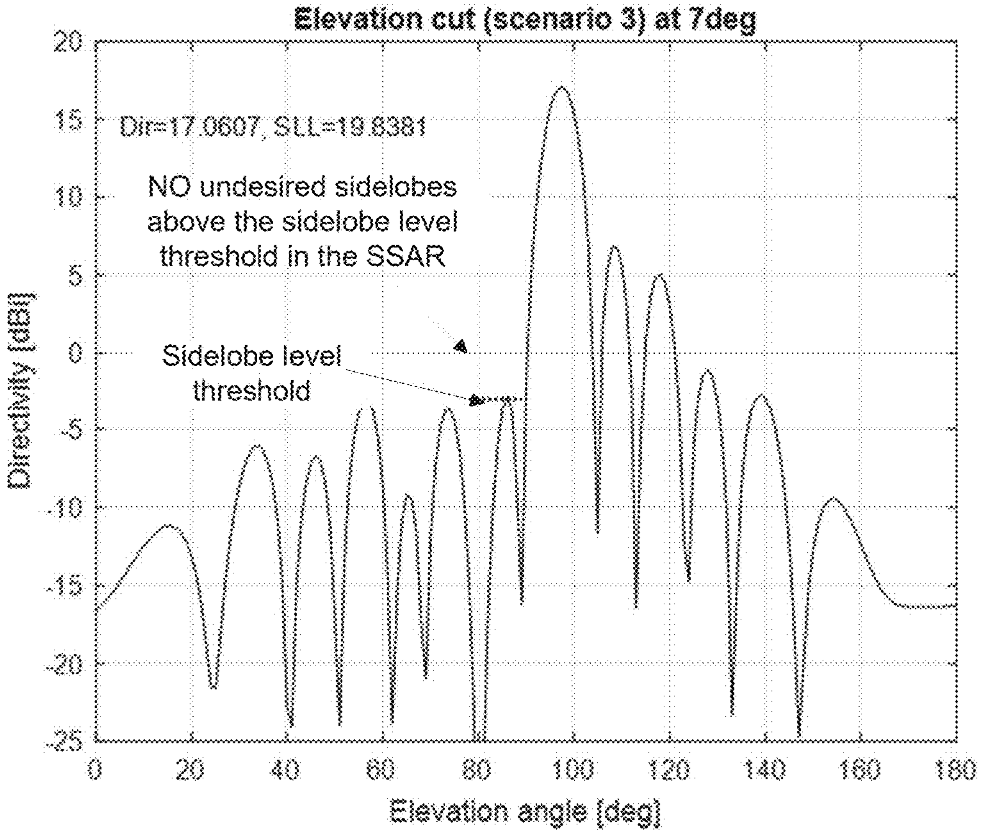
FIG. 10 illustrates an example beam tilted down 7 degrees (peak at 97 degrees) with optimized phase only taper (scenario 3)

FIG. 10 is a graph that illustrates an example of a beam tilted down 7 degrees (peak at 97 degrees) with optimized phase only taper (scenario 3).

Figure 11:
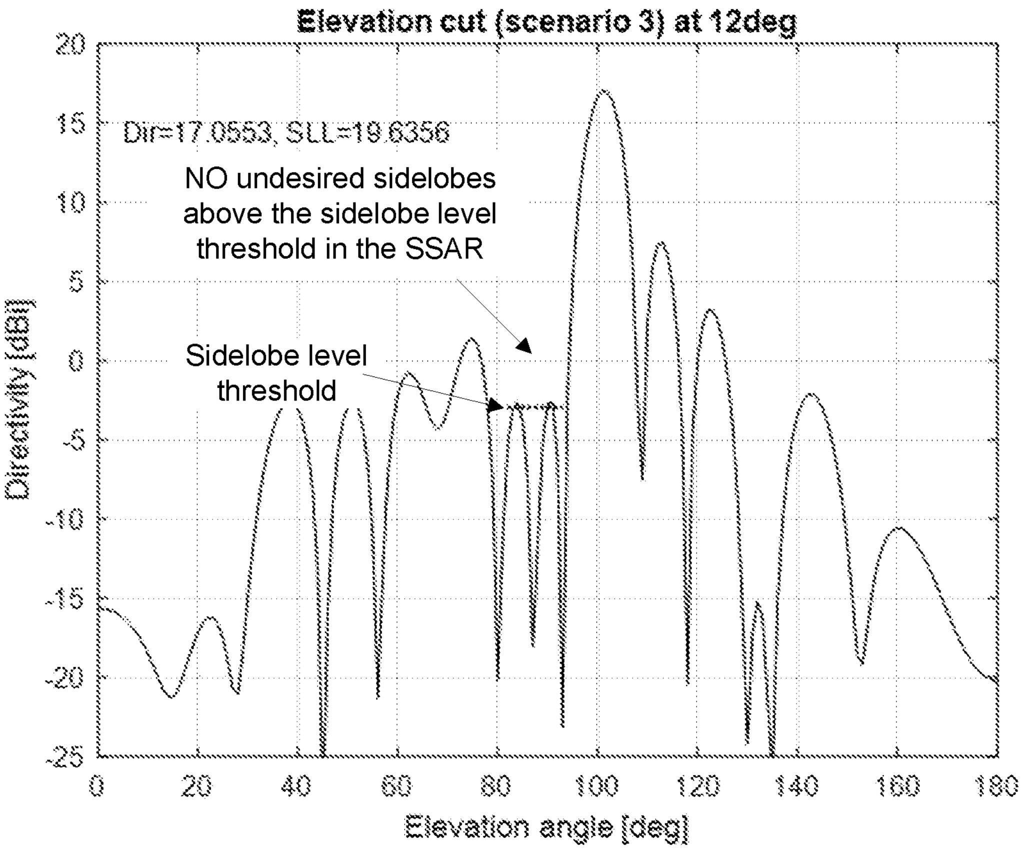
FIG. 11 illustrates an example beam tilted down 12 degrees (peak at 102 degrees) with optimized phase only taper (scenario 3)

FIG. 11 is a graph that illustrates an example of a beam tilted down 12 degrees (peak at 102 degrees) with optimized phase only taper (scenario 3).

As can be seen in FIGS. 6-11 (particularly in comparison with FIGS. 3-5, where the AUSS optimization/configuration procedure was not performed), the sidelobe levels are not present above the sidelobe level threshold in the SSAR, and are thereby sufficiently suppressed without sacrificing antenna efficiency, for each of the depicted tilt angles in FIGS. 6-11 and across the different scenarios (optimized amplitude and phase taper as well as the optimized phase only taper). Thus, using the techniques provided in the present disclosure the upper sidelobes may be suppressed to below the sidelobe level threshold in the SSAR.

In some alternative embodiments, the spacing/distance 24 between the different antenna elements 22 may be designed to be different (e.g., a first distance 24 between antenna elements 22*a* and 22*b* and a second distance 24 between antenna elements 22*b* and 22*c*, which may be different distance values). In some embodiments this may provide certain advantages with controlling the beam shapes and sidelobes.

Second Embodiment Antenna Array

Figure 12:
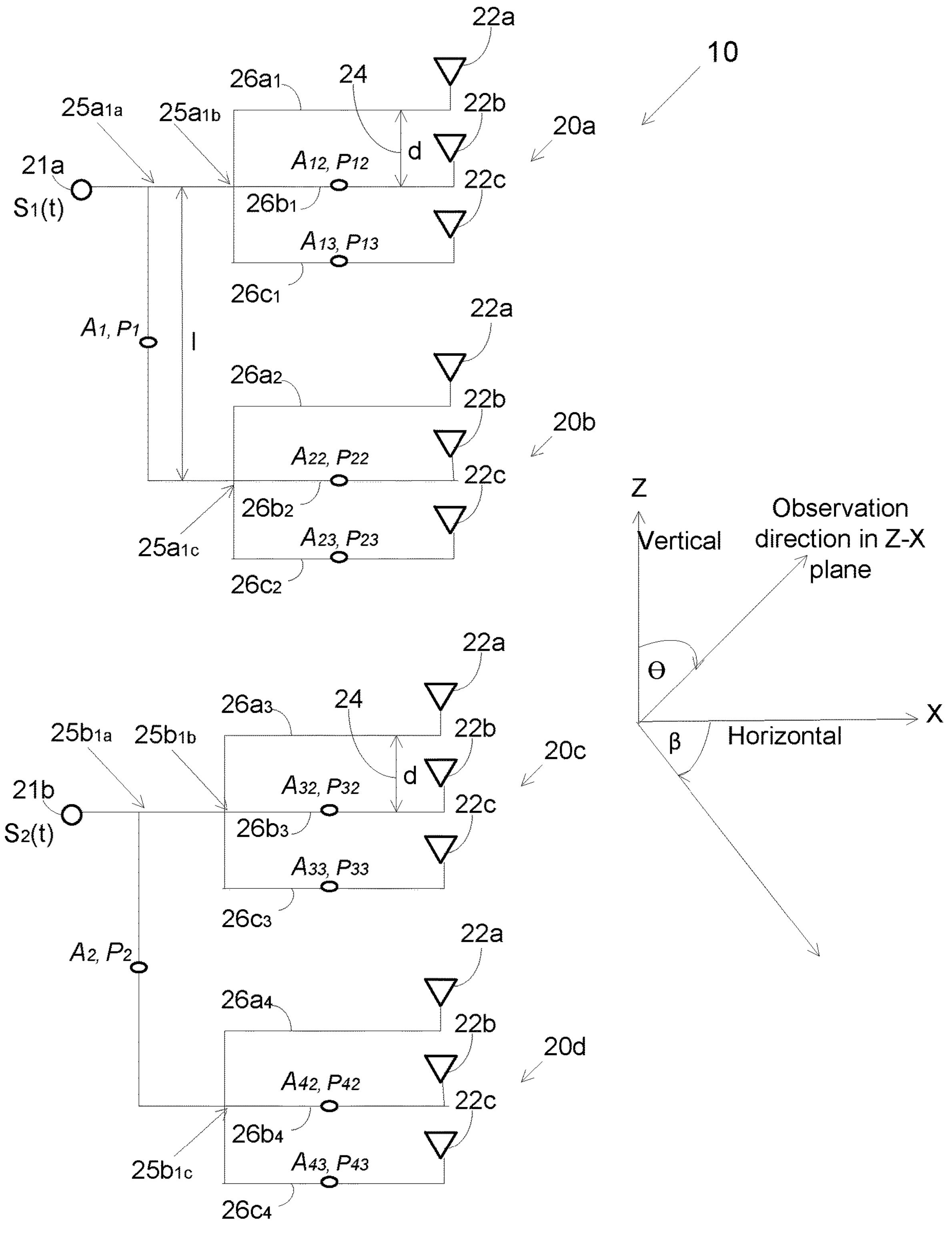
FIG. 12 is a schematic diagram illustrating an antenna array configuration according to another embodiment of the present disclosure.

FIG. 12 illustrates yet another example antenna system 10 having an array configuration according to a second embodiment of the present disclosure. In this embodiment, the antenna array shown in FIG. 12 includes one column of a multi-column array and has dual polarization per column. The antenna array includes N=4 antenna subarrays 20. In this embodiment, there are two subarray inputs 21*a* and 21*b*, corresponding to two input signal $s_h(t)$ and where h=mod (i−1, 2)+1 and i=1, 2, . . . , N is the subarray index and t is the time sample. There is K=3 antenna elements 22*a*, 22*b*, 22*c* per antenna subarray 20 and the spacing/distance 24 between antenna elements 22 is d. The spacing/distance 24, d, between the antenna elements 22 may be the same in some embodiments, or different in some embodiments. The phase and amplitude values of the branches 26 of each antenna subarray 20 relative to the first branch 26*a* is $A_{ik}$ and $P_{ik}$, where k=1, 2, . . . , K is the branch index.

Each subarray input 21*a* and 21*b* signal $s_h(t)$ is hardware split to two antenna subarrays 20*a*, 20*b* and 20*c*, 20*d*, respectively, by first subarray splitters 25*a*$_{1a}$ and 25*b*$_{1a}$. The signal to one of the split antenna subarrays (e.g., subarrays 20*b* and 20*d*) after the first splitters 25*a*$_{1a}$ and 25*b*$_{1a}$ is then modified with amplitude $A_h$ and $P_h$, as shown in FIG. 12.

The amplitude $A_h$ can be implemented with an unequal 2-way splitter (e.g., first subarray splitters 25$a_{1a}$ and 25$b_{1a}$) and the phase part can be implemented with a fixed phase shifter, e.g., a line length, l, difference relative to first antenna subarray 20a and 20c, respectively, or can be implemented with a variable phase shifter. Thus, the phase shifter may be a fixed phase shifter or a variable phase shifter. The phase shifter can have a set value for a range of digital/electrical tilt angles or can be set for each tilt angle. Although the example shown in FIG. 12 includes use of a two-way splitter, it should be understood that, in some embodiments, such splitter may be a multi-way splitter that can hardware split an input signal into more than two antenna subarrays 20 (e.g., 3 or more).

The antenna array further includes a second level of subarray splitters 25$a_{1b}$, 25$a_{1c}$ and 25$b_{1b}$, 25$b_{1c}$ which further splits each the corresponding antenna subarrays 20 into a plurality of branches 26.

The cost function for this embodiment may be equivalent to that in equation (6), but also includes $A_h$ and $P_h$. A restriction where $P_1$ is equal to $P_2$ can be allowed when a common control mechanism will be used for both phase shifters.

Example Configuration/Optimization Procedures for AUSS

The same optimization algorithm discussed for the first embodiment antenna array configuration shown in FIG. 2, can also be used for this embodiment.

The method described for AUSS above can also be used with an electromagnetic simulation tool, such as HFSS. In this case, the optimization/configuration procedure may be performed, for example, as follows:

1. The optimization algorithm may insert the excitations in the HFSS.
2. HFSS may calculate the far field radiation patterns.
3. The radiation patterns may then be exported.
4. The optimization algorithm may determine $U_s$ from the radiation patterns.
5. The optimization algorithm may determine $U_p$.
6. The optimization algorithm may then determine the cost function $U_{opt}$.
7. The optimization algorithm may then return to step 1 and steps 1-6 repeated, e.g., for different phase and amplitude values over the tilt angle range and desired frequencies.
8. All steps may be repeated in a loop until the cost function is below a desired value.

An alternative optimization/configuration procedure may be to export the HFSS calculated far field element patterns with unity excitations applied and then use that with the excitations of equations (1) and (2).

Figure 13:
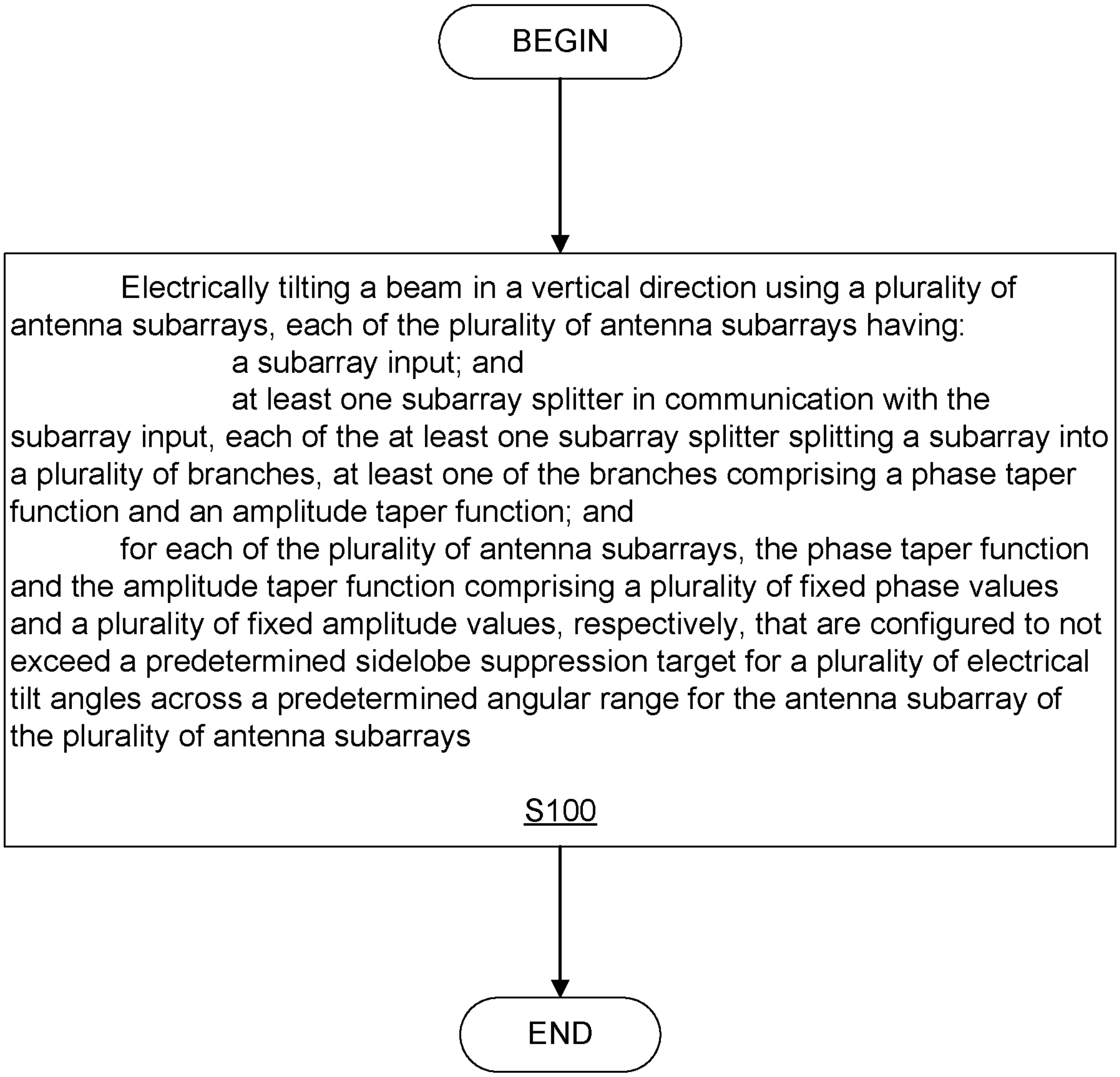
FIG. 13 is a flowchart of an example method for an antenna system according to one embodiment of the present disclosure.

FIG. 13 is a flowchart of an exemplary process in an antenna system 10 having advanced upper sidelobe suppression (AUSS) according to some embodiments of the present disclosure. One or more Blocks and/or functions and/or methods performed by the antenna system 10 may be performed by one or more elements of antenna system 10 such as the antenna subarrays 20, the subarray inputs 21, the antenna elements 22, the subarray splitters 25, the branches 26, etc. according to the example method. The example method includes the antenna system 10 configured to electrically tilt (Block S100) a beam in a vertical direction using a plurality of antenna subarrays 20, each of the plurality of antenna subarrays 20 having: a subarray input 21; and at least one subarray splitter 25 in communication with the subarray input 21, each of the at least one subarray splitter 25 splitting the antenna subarray 20 into a plurality of branches 26, at least one of the branches 26 comprising a phase taper function and an amplitude taper function; and for each of the plurality of antenna subarrays 20, the phase taper function and the amplitude taper function comprising a plurality of fixed phase values and a plurality of fixed amplitude values, respectively, that are configured to not exceed a predetermined sidelobe suppression target for a plurality of electrical tilt angles across a predetermined angular range for the antenna subarray 20 of the plurality of antenna subarrays 20.

In some embodiments, the phase taper function comprises a phase progression and a phase taper. In some embodiments, each fixed phase value of the plurality of fixed phase values corresponds to a single frequency, and each fixed amplitude value of the plurality of fixed amplitude values corresponds to a single frequency.

In some embodiments, each of the plurality of antenna subarrays 20 includes a plurality of antenna elements 22, a first antenna element 22 of the plurality of antenna elements 22 being separated from a second antenna element 22 of the plurality of antenna elements 11 by a first distance 24, d, wherein the phase taper function is based in part on the first distance 24, d. In some embodiments, the antenna system 10 further includes, for at least one of the plurality of antenna subarrays 20, a third antenna element 22 of the plurality of antenna elements 22, the third antenna element 22 being separated from the second antenna element 22 by a second distance 24, the second distance 24 being different from the first distance 24, d.

In some embodiments, the predetermined sidelobe suppression target is a maximum sidelobe level threshold in a sidelobe suppression angular region (e.g., according to a specification requirement). In some embodiments, the sidelobe suppression angular region is at least one of: according to a specification requirement; and 20 degrees above a peak. In some embodiments, the predetermined angular range is between 2 degrees and 12 degrees relative to a horizon.

In some embodiments, the plurality of fixed phase values and the plurality of fixed amplitude values are configured to not exceed the predetermined sidelobe suppression target for the plurality of electrical tilt angles and further for a plurality of frequencies. In some embodiments, the plurality of fixed phase values and the plurality of fixed amplitude values are configured to not exceed the predetermined sidelobe suppression target for the plurality of electrical tilt angles and further for a set of phase and amplitude excitation values corresponding to at least one input signal into the subarray input 21, the at least one input signal corresponding to at least one cellular signal and the set of phase and amplitude excitation values being for electrically titling the beam of the antenna system 10 in the vertical direction.

In some embodiments, each of the plurality of electrical tilt angles are different from one another and the configuration of the plurality of fixed phase values and the plurality of fixed amplitude values is to not exceed the predetermined sidelobe suppression target for each of the plurality of different, electrical tilt angles across the predetermined angular range. In some embodiments, the configuration is according to an algorithm to minimize a cost function. In some embodiments, the cost function is based at least in part on at least one of: a maximum power of at least one sidelobe in a sidelobe suppression angular region for each of the plurality of electrical tilt angles; a power at a beam peak direction at each of the plurality of electrical tilt angles; a target power of a beam peak at each of the plurality of electrical tilt angles; a target sidelobe power at each of the plurality of electrical tilt angles; and at least one weighting factor associated with a specification requirement for at least one of the plurality of electrical tilt angles.

In some embodiments, the at least one subarray splitter 25 includes one subarray splitter 25 in communication with the corresponding subarray input 21. In some embodiments, the at least one subarray splitter 25 includes a multi-way splitter 25 in communication with the corresponding subarray input 21, the multi-way splitter 25 splitting the antenna subarray 20 into at least two antenna subarrays 20; at least one phase shifter at an output of the multi-way splitter 25 and between the multi-way splitter 25 and at least one antenna subarray 20 of the at least two antenna subarrays 20; and for each of the at least two antenna subarrays 20, a second subarray splitter 25 splitting the respective antenna subarray 20 into the plurality of branches 26.

Some embodiments of the present disclosure may provide for one or more of: significant improvement in the upper sidelobe level over a required tilt range; no taper loss in the antenna; and no loss in EIRP due to taper loss as there is no amplitude taper at the subarray inputs for the input signals.

Some embodiments of the present disclosure may include providing an antenna system including a design for a sub-array phase taper at a center frequency of a band and implementing the phase taper with splitters with fixed transmission line lengths (and a phase shifter in the case of e.g., the second embodiment antenna system relative to the two sub-array groups). In some such embodiments, the relative phase between the antenna elements may accordingly automatically vary as the frequency changes.

Abbreviations that may be used in the preceding description include:

| Abbreviation | Explanation |
|---|---|
| AAS | Advanced Antenna Systems |
| FDD | Frequency Division Duplex |
| PIM | Passive Intermodulation |
| RET | Remote electrical tilt |
| TDD | Time Domain Duplex |
| WCDMA | Wideband Code Division Multiple Access |

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. An antenna system, the antenna system comprising:

a plurality of antenna subarrays, each of the plurality of antenna subarrays having:

a subarray input; and at least one subarray splitter in communication with the subarray input, each of the at least one subarray splitter splitting the antenna subarray into a plurality of branches, at least one of the branches comprising a phase only taper function; and for each of the plurality of antenna subarrays, the phase only taper function comprising a plurality of fixed phase values that are configured to not exceed a predetermined sidelobe suppression target for a plurality of electrical tilt angles across a predetermined angular range for the antenna subarray of the plurality of antenna subarrays;

each of the plurality of antenna subarrays includes a plurality of antenna elements, a first antenna element of the plurality of antenna elements being separated from a second antenna element of the plurality of antenna elements by a first distance, d;

for at least one of the plurality of antenna subarrays, the plurality of antenna elements further comprises a third antenna element that is separated from the second antenna element by a second distance, the second distance being different from the first distance, d; and the first, second and third antenna elements are adjacent to one another.

2. The antenna system of claim 1, wherein the phase only taper function comprises a phase progression and a phase taper.

3. The antenna system of claim 1, wherein each fixed phase value of the plurality of fixed phase values corresponds to a single frequency.

4. The antenna system of claim 1, wherein the predetermined sidelobe suppression target is a maximum sidelobe level threshold in a sidelobe suppression angular region.

5. The antenna system of claim 4, wherein the sidelobe suppression angular region is at least one of:

according to a specification requirement; and 20 degrees above a peak.

6. The antenna system of claim 1, wherein the predetermined angular range is between 2 degrees and 12 degrees relative to a horizon.

7. The antenna system of claim 1, wherein the plurality of fixed phase values and a plurality of fixed amplitude values are configured to not exceed the predetermined sidelobe suppression target for the plurality of electrical tilt angles and further for a plurality of frequencies.

8. The antenna system of claim 1, wherein the plurality of fixed phase values and a plurality of fixed amplitude values are configured to not exceed the predetermined sidelobe suppression target for the plurality of electrical tilt angles and further for a set of phase and amplitude excitation values corresponding to at least one input signal into the subarray input, the at least one input signal corresponding to at least one cellular signal and the set of phase and amplitude excitation values being for electrically titling a beam of the antenna system in a vertical direction.

9. The antenna system of claim 1, wherein each of the plurality of electrical tilt angles are different from one another and the configuration of the plurality of fixed phase values is to not exceed the predetermined sidelobe suppression target for each of the plurality of different, electrical tilt angles across the predetermined angular range.

10. The antenna system of claim 1, wherein the configuration is according to an algorithm to minimize a cost function.

11. The antenna system of claim 10, wherein the cost function is based at least in part on at least one of:

a maximum power of at least one sidelobe in a sidelobe suppression angular region for each of the plurality of electrical tilt angles;

a power at a beam peak direction at each of the plurality of electrical tilt angles;

a target power of a beam peak at each of the plurality of electrical tilt angles;

a target sidelobe power at each of the plurality of electrical tilt angles; and at least one weighting factor associated with a specification requirement for at least one of the plurality of electrical tilt angles.

12. The antenna system of claim 1, wherein the at least one subarray splitter comprises:

one subarray splitter in communication with the corresponding subarray input.

13. The antenna system of claim 1, wherein the at least one subarray splitter comprises:

a multi-way splitter in communication with the corresponding subarray input, the multi-way splitter splitting the antenna subarray into at least two antenna subarrays;

at least one phase shifter at an output of the multi-way splitter and between the multi-way splitter and at least one antenna subarray of the at least two antenna subarrays; and for each of the at least two antenna subarrays, a second subarray splitter splitting the respective antenna subarray into the plurality of branches.

14. A method implemented in an antenna system, the method comprising:

electrically tilting a beam in a vertical direction using a plurality of antenna subarrays, each of the plurality of antenna subarrays having:

a subarray input; and at least one subarray splitter in communication with the subarray input, each of the at least one subarray splitter splitting the antenna subarray into a plurality of branches, at least one of the branches comprising a phase only taper function; and for each of the plurality of antenna subarrays, the phase only taper function comprising a plurality of fixed phase values that are configured to not exceed a predetermined sidelobe suppression target for a plurality of electrical tilt angles across a predetermined angular range for the antenna subarray of the plurality of antenna subarrays;

each of the plurality of antenna subarrays includes a plurality of antenna elements, a first antenna element of the plurality of antenna elements being separated from a second antenna element of the plurality of antenna elements by a first distance, d;

for at least one of the plurality of antenna subarrays, the plurality of antenna elements further comprises a third antenna element that is separated from the second antenna element by a second distance, the second distance being different from the first distance, d; and the first, second and third antenna elements are adjacent to one another.

15. The method of claim 14, wherein the phase only taper function comprises a phase progression and a phase taper.

16. The method of claim 14, wherein each fixed phase value of the plurality of fixed phase values corresponds to a single frequency.

17. The method of claim 14, wherein the predetermined sidelobe suppression target is a maximum sidelobe level threshold in a sidelobe suppression angular region.

18. The method of claim 17, wherein the sidelobe suppression angular region is at least one of:

according to a specification requirement; and 20 degrees above a peak.

19. The method of claim 14, wherein the predetermined angular range is between 2 degrees and 12 degrees relative to a horizon.

20. The method of claim 14, wherein the plurality of fixed phase values and a plurality of fixed amplitude values are configured to not exceed the predetermined sidelobe suppression target for the plurality of electrical tilt angles and further for a plurality of frequencies.

21. The method claim 14, wherein the plurality of fixed phase values and a plurality of fixed amplitude values are configured to not exceed the predetermined sidelobe suppression target for the plurality of electrical tilt angles and further for a set of phase and amplitude excitation values corresponding to at least one input signal into the subarray input, the at least one input signal corresponding to at least one cellular signal and the set of phase and amplitude excitation values being for electrically titling the beam of the antenna system in the vertical direction.

22. The method of claim 14, wherein each of the plurality of electrical tilt angles are different from one another and the configuration of the plurality of fixed phase values is to not exceed the predetermined sidelobe suppression target for each of the plurality of different, electrical tilt angles across the predetermined angular range.

23. The method of claim 14, wherein the configuration is according to an algorithm to minimize a cost function.

24. The method of claim 23, wherein the cost function is based at least in part on at least one of:

a maximum power of at least one sidelobe in a sidelobe suppression angular region for each of the plurality of electrical tilt angles;

a power at a beam peak direction at each of the plurality of electrical tilt angles;

a target power of a beam peak at each of the plurality of electrical tilt angles;

a target sidelobe power at each of the plurality of electrical tilt angles; and at least one weighting factor associated with a specification requirement for at least one of the plurality of electrical tilt angles.

25. The method of claim 14, wherein the at least one subarray splitter comprises:

one subarray splitter in communication with the corresponding subarray input.

26. The method of claim 14, wherein the at least one subarray splitter comprises:

a multi-way splitter in communication with the corresponding subarray input, the multi-way splitter splitting the antenna subarray into at least two antenna subarrays;

at least one phase shifter at an output of the multi-way splitter and between the multi-way splitter and at least one antenna subarray of the at least two antenna subarrays; and for each of the at least two antenna subarrays, a second subarray splitter splitting the respective antenna subarray into the plurality of branches.

* * * * *